(12) United States Patent
Trivette

(10) Patent No.: US 8,011,498 B2
(45) Date of Patent: Sep. 6, 2011

(54) MODULAR CONVEYOR SYSTEM AND METHOD

(76) Inventor: Roger Blaine Trivette, Boiling Springs, SC (US)

(*) Notice: Subject to any disclaimer, the term of this patent is extended or adjusted under 35 U.S.C. 154(b) by 50 days.

(21) Appl. No.: 12/567,960

(22) Filed: Sep. 28, 2009

(65) Prior Publication Data

US 2011/0073443 A1    Mar. 31, 2011

(51) Int. Cl.
*B65G 21/10* (2006.01)
(52) U.S. Cl. .......... 198/860.2; 198/861.1; 198/813
(58) Field of Classification Search .............. 198/860.2, 198/861.1, 813
See application file for complete search history.

(56) References Cited

U.S. PATENT DOCUMENTS

| | | | |
|---|---|---|---|
| 2,951,580 A | | 9/1960 | Slomer |
| 4,799,584 A | * | 1/1989 | Hartsuiker et al. ........ 198/861.1 |
| 4,881,633 A | * | 11/1989 | Cailey et al. ............. 198/860.2 |
| 4,925,009 A | | 5/1990 | Hill |
| 4,993,542 A | * | 2/1991 | Nomura .................... 198/860.2 |
| 5,096,045 A | | 3/1992 | Feldl |
| 5,174,435 A | | 12/1992 | Dorner et al. |
| 5,609,238 A | | 3/1997 | Christensen |
| 5,692,597 A | | 12/1997 | Ferguson |
| 5,947,263 A | | 9/1999 | Uber et al. |
| 5,947,264 A | | 9/1999 | Eltvedt |
| 6,036,003 A | * | 3/2000 | Swanson ................... 198/860.2 |
| 6,935,487 B2 | | 8/2005 | Schaum et al. |
| 7,681,719 B2 | * | 3/2010 | Hosch et al. ............... 198/861.1 |

FOREIGN PATENT DOCUMENTS

DE    4136154    * 5/1993

* cited by examiner

*Primary Examiner* — James R Bidwell
(74) *Attorney, Agent, or Firm* — Thomas L. Moses; Monahan & Moses, LLC

(57) ABSTRACT

A low profile, portable, modular conveyor system is provided. The conveyor system includes three main components: a drive end, having a motor and gearboxes used to drive a pair of drive wheels, a center section, and an idle section comprising a stationary component attached to the center section and a pivoting component allowing the distal portion of the idle end to pivot in a transverse direction. The conveyor system includes means for hydraulically or mechanically adjusting the tension and tracking of the conveyor belt. The drive end may be removed from the conveyor system in a transverse direction relative to the longitudinal direction of the conveyor system.

17 Claims, 5 Drawing Sheets

MODULAR CONVEYOR SYSTEM AND METHOD

BACKGROUND OF THE INVENTION

The present invention relates generally to conveyor systems. More specifically, the present invention relates to portable, modular conveyor systems that are easily disassembled and maintained.

Conveyor systems are used in many different applications for moving goods or items from one place to another by means of moving belts, rollers and the like, particularly in manufacturing and industrial applications. Typically, a conveyor system utilizes a single drive member to drive a belt around a series of rollers.

However, several problems exist with conventional conveyor systems. First, many such conveyor systems are permanently installed in factories and manufacturing plants, and may not be easily moved around or relocated as necessity dictates. Secondly, it is necessary to maintain a precise alignment between the belt and the drive and rollers at either end of the conveyor system, so that the belt will stay on track, and to prevent the edges of the belt from becoming frayed and worn. Although it is possible to make such adjustments to the alignment on conventional conveyor belts, it often requires partial disassembly of the machine, thus requiring much labor and time during which the machine, and thus the assembly line, are not operational. Further, if the drive unit or motor of the conveyor system requires maintenance or replacement, sometimes it is necessary not only to disassemble the conveyor unit, but it may be necessary to move or disassemble adjacent components of the assembly line due to their close proximity along the assembly line. In other words, for a worker to repair a conveyor motor, many times they will have to move or partially disassemble other machines that are adjacent the drive end of the conveyor, just to gain access to the motor for disassembly and/or repair. Further, conventional conveyors are typically long and bulky in their assembled form, making them difficult and unwieldy to ship and transport.

It would therefore be desirable to provide a portable, low profile, modular conveyor system that overcomes the disadvantages inherent in many conventional conveyor systems.

BRIEF SUMMARY OF THE INVENTION

In accordance with one aspect of the invention, a portable, modular conveyor system is provided. The conveyor system, in one embodiment, includes three sections: a drive end, a center section, and an idle end. In a preferred embodiment, the drive end includes an internally mounted electric motor (preferably a 150 watt, 24 volt Maxon motor number 241301 manufactured by Maxon Precision Motors) that is connected to a planetary gear box and then to a 90° gear box. The 90° gear box includes an axle that is used to rotate a pair of textured drive wheels, which in turn drive the belt about the system. The center section may be manufactured to any desired length, and connects to the drive end on a first end and an idle end at a second end.

The idle end includes a hydraulic or mechanical tension adjustment mechanism that may be used to tighten or loosen the belt, and which may also be used to adjust the tracking of the belt from one side to the other.

The center section and the drive end may include complementary sideways sliding dovetail mechanisms, so that the drive end simply slides onto the center section from a transverse direction relative to the longitudinal direction of the conveyor system. Of course, other attachment mechanisms may be used to connect the drive end and the idle end to the center section, if desired. This arrangement allows a user to easily replace a belt without using any tools while the conveyor system remains in position, even if the system is positioned in a tight spot between other assembly line components. Additionally, this arrangement is useful for replacing a motor, because the belt may be removed and then the motor can be extracted from the side of the system without having to move the conveyor system itself, or other surrounding equipment. Further, because the motor is mounted within the system (within the periphery of the belt in the operating position), the conveyor system includes a low profile, and may fit into smaller areas than conventional conveyor systems where the motor is mounted on a side thereof.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
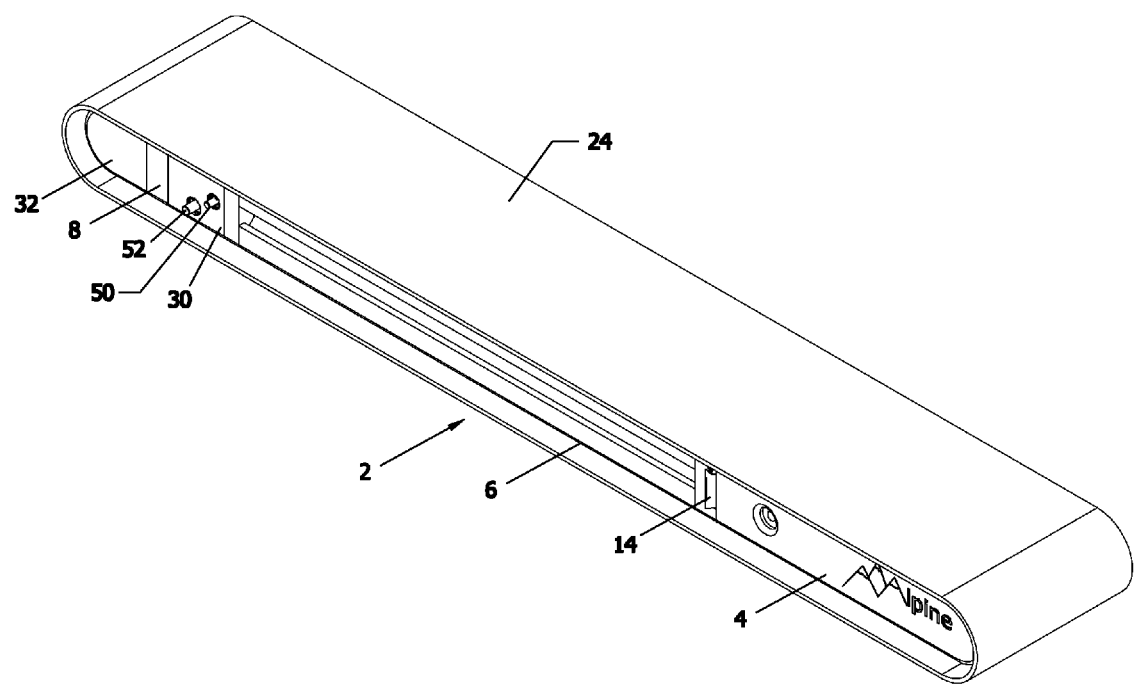
FIG. 1 is a perspective view of one embodiment of the modular conveyor system.
Figure 2:
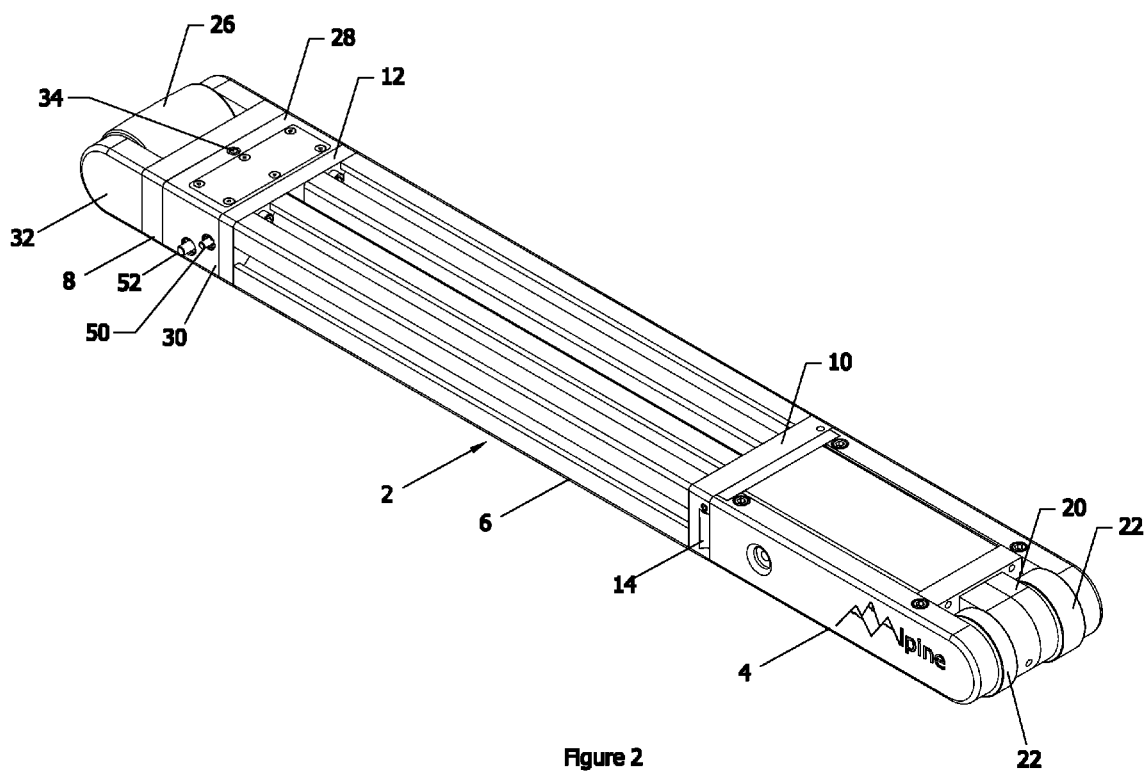
FIG. 2 is a perspective view of one embodiment of the modular conveyor system without the conveyor belt.
Figure 3:
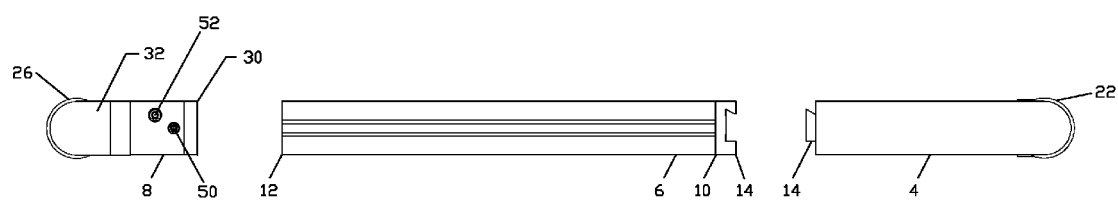
FIG. 3 is an exploded side view of one embodiment of the modular conveyor system.
Figure 4:
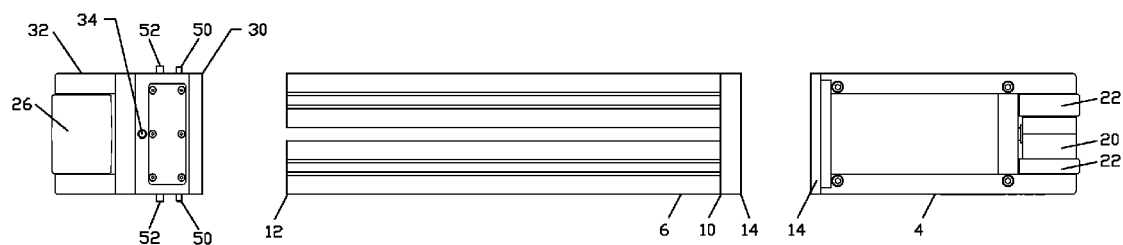
FIG. 4 is an exploded top view of one embodiment of the modular conveyor system.
Figure 5:
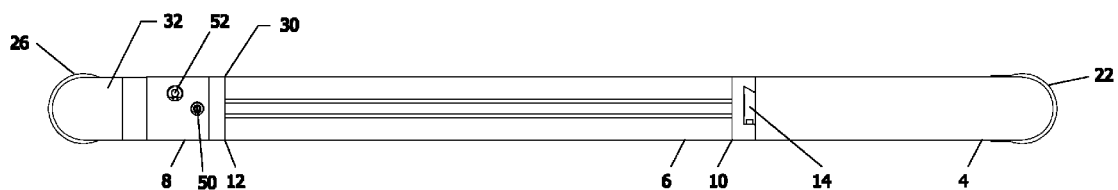
FIG. 5 is a side view of one embodiment of the modular conveyor system.
Figure 6:
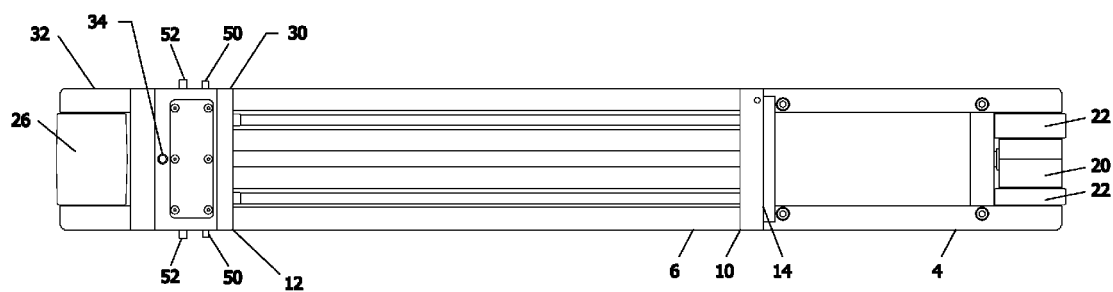
FIG. 6 is a top view of one embodiment of the modular conveyor system
Figure 7:
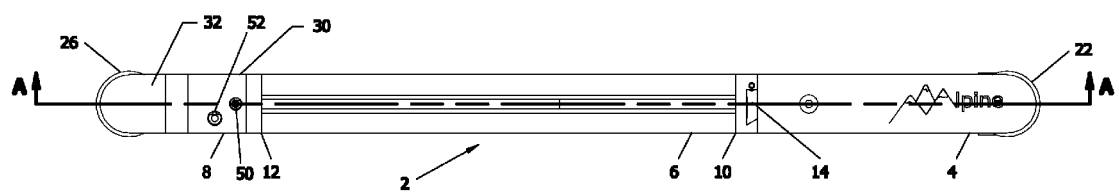
FIG. 7 is a side view of one embodiment of the modular conveyor system.
Figure 8:
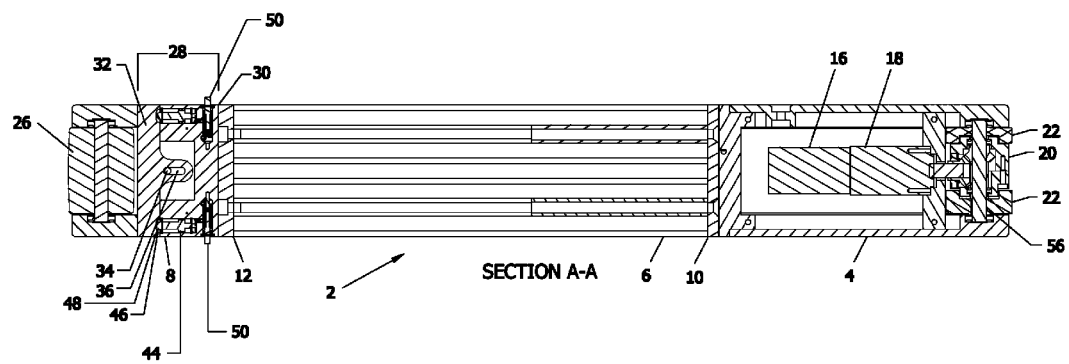
FIG. 8 is a cross sectional top view along the line A-A as shown in FIG. 7.

A first embodiment of a modular conveyor system is shown in FIG. 1. The modular conveyor system 2, in one embodiment, comprises three main structural components: a drive end 4, a center section 6, and an idle end 8. These components may be assembled by attaching the drive end 4 to a first end 10 of the center section 6, and by attaching the idle end 8 to a second end 12 of the center section 6. In a preferred embodiment, the center section 6 and the drive end 4 may include a complementary sideways sliding dovetail mechanism 14, which allows the drive end 4 to be attachable to the center section 6 in a transverse direction relative to the longitudinal axis of the conveyor system 2. This arrangement allows the drive end 4, for instance, to be removed from the center section 6 by sliding the drive end 4 in a sideways manner away from the center section 6, which is advantageous when the conveyor system 2 is in place within an assembly line.

The drive end 4 includes, in a preferred embodiment, an electric motor 16 having an infinitely adjustable rotation speed connected to a pair of gear boxes 18, 20. In this preferred embodiment, the motor 16 is attached to a first planetary gear box 18, which is then connected to a 90° gear box 20, which drives a pair of drive wheels 22. Preferably, the drive wheels 22 have a texturized surface (such as a polyester powder coating) that facilitates traction between the drive wheels 22 and the inside surface of the belt 24. The motor 16 is positioned adjacent the gear boxes 18 and 20, within the frame of the drive end 4 and inside the inner periphery of the belt 24 when the belt 24 is in its operational position on the conveyor system 2. Optionally, for applications where the unit will be required to stop and start on a frequent basis, a microclutch (not shown) may be used, where the motor 16 is attached to the clutch, which is then attached to the gearboxes 18 and 20 as set forth herein. As an example, a Helander clutch may be used. This arrangement serves to extend the life of the motor 16 when the conveyor system 2 is used in stop/start applications.

It is contemplated that several variations of speed controls may be utilized for the modular conveyor system 2. For applications where the motor 16 will run at a single, continuous speed, a simple power supply may be used. As discussed herein, a clutch or microclutch may be used for stop/start applications. Additionally, a variable speed drive control may be utilized for applications wherein the speed of the motor 16, and thus the speed of the belt 24, is adjusted as desired. A clutch or microclutch may also be used in conjunction with a variable speed drive control, as well.

The center section 6 is simply a longitudinal frame, manufactured to a desired length and preferably made from aluminum (although other suitable materials may be used). The center section 6 includes attachment means for receiving the drive end 4 on a first end 10 thereof, and further includes attachment means for receiving the idle end 8 at a second end 12 thereof. In a preferred embodiment, the idle end 8 is simply attached to the center section using screws or bolts, or any other suitable means of attachment.

The idle end 8 preferably includes a roller 26 and a self-contained hydraulic tensioning and tracking adjustment apparatus 28 (although it is contemplated that a mechanical tensioning and tracking apparatus may also be used). The idle end 8 includes a stationary component 30 and a pivoting component 32. The stationary component 30 is attached to the center section 6, and the pivoting component 32 is attached to the stationary component 30 via a centrally located pivot pin 34 so that the pivoting component 32 may pivot slightly about the pivot pin 34 in a transverse direction with respect to the longitudinal axis of the conveyor system 2. Additionally, the pivot pin 34 is seated in a longitudinally oriented oval shaped opening 36 within the stationary component 30, allowing the pivoting component 32 to move slightly in a longitudinal direction with respect to the modular conveyor system 2. The hydraulic tensioning apparatus 28 preferably utilizes a manual hydraulic pump and a fluid release mechanism on either side of the idle end 8 that is used to tighten the belt 24 and to adjust the tracking of the belt 24 for precise alignment by adjusting the position of the pivoting component 32.

When fluid is pumped into a chamber on one side via the manual hydraulic pump, a spring loaded piston 44 is forced from the stationary component 30 outwardly toward the pivoting component 32 on the corresponding side, which forces the pivoting component 32 to pivot toward the opposite side. The piston 44 is located within the stationary component 30, and preferably includes a ball nosed end 46 that fits into an elongated ball shaped receptacle 48 within the pivoting component 32 to allow a wide range of motion for adjustment purposes.

Each lateral side of the idle end 8 includes two control buttons. The pump button 50 is used to pump fluid into an inner chamber on the same side as the pump button 50, thus increasing the longitudinal length of the idle end 8 (and belt tension) on that corresponding side, and causing the idle end 8 to pivot slightly toward the opposite side. The release button 52 is used to release fluid from the chamber, thereby reducing the length of the idle end 8 (and loosening tension) on that side and allowing the pivoting component 32 to pivot back toward that corresponding side. In order to fit the belt 24 onto the system for operation, a user releases fluid on each side of the idle end by pressing the release buttons 52, thereby shortening the longitudinal length of the idle end 8. In this shortened configuration, the belt 24 easily slides onto the conveyor system 2. Then the user engages the pump buttons 50 on either side of the idle end 8, thereby lengthening the idle end 8 (and thus the overall system) and creating tension in the belt 24. Finally, the user adjusts the tension on either side in order to precisely align the belt 24 so that it rotates properly about the conveyor system 2. If, after the belt 24 has been in operation, the alignment between the belt 24 and the conveyor system 2 becomes misaligned, a user may simply realign the belt 24 using the pump 50 and release buttons 52 on either side of the idle end 8.

Conveyor belts 24 are well known in the art, and any suitable belt may be used with the modular conveyor system. Additionally, hydraulic pump mechanisms are used for many different applications, and are well known in the art.

In an alternate embodiment, a wider version of the modular conveyor system 2 includes additional rollers located on the drive axle 56, and a pressure pad (not shown) installed beneath the weight bearing portion of the belt 24.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What I claim is:

1. A modular conveyor system comprising:
   a drive end having a motor that drives at least one drive wheel,
   a center section connected to said drive end so that said drive end may be removed from said center section in a transverse direction with respect to a longitudinal direction of said modular conveyor system;
   an idle end attached to an opposed end of said center section from said drive end, said idle end including a roller and means for adjusting belt tension and tracking that includes at least one manual hydraulic pump with a release valve; and
   a conveyor belt extending about said drive end, center section, and idle end so that said drive wheel may rotate said conveyor belt about said modular conveyor system.

2. The modular conveyor system set forth in claim 1, wherein said motor is attached to a clutch.

3. The modular conveyor system set forth in claim 1, wherein said idle end includes a stationary component that is attached to said center section, and a pivoting component that is attached to said stationary component so that said pivoting component may pivot in a transverse direction with respect to the longitudinal direction of said modular conveyor system.

4. The modular conveyor system set forth in claim 3, wherein said pivoting component may also slide in a longitudinal direction, thereby allowing the length of said idle end to be increased or decreased.

5. The modular conveyor system set forth in claim 1, wherein said drive wheel includes a texturized surface.

6. The modular conveyor system set forth in claim 1, wherein said drive end further includes a planetary gear box connected to said motor.

7. The modular conveyor system set forth in claim 6, wherein said planetary gear box is connected to a 90° gear box.

8. The modular conveyor system set forth in claim 1, wherein said motor is attached to a clutch.

9. The modular conveyor system set forth in claim 1, wherein said drive end is attached to said center section by means of a complementary transverse sliding dovetail mechanism.

10. The modular conveyor system set forth in claim 1, further including a variable speed drive control attached to and in operable communication with said motor.

11. The modular conveyor system set forth in claim 1, wherein said drive end is attached to said center section by means of a complementary transverse sliding dovetail mechanism.

12. The modular conveyor system set forth in claim 1, further including a variable speed drive control attached to and in operable communication with said motor.

13. The modular conveyor system set forth in claim 1, wherein said drive wheel includes a texturized surface.

14. The modular conveyor system set forth in claim 1, wherein said drive end further includes a planetary gear box connected to said motor.

15. The modular conveyor system set forth in claim 6, wherein said planetary gear box is connected to a 90° gear box.

16. A modular conveyor system comprising:
a drive end having a motor that drives at least one drive wheel,
a center section connected to said drive end so that said drive end may be removed from said center section in a transverse direction with respect to a longitudinal direction of said modular conveyor system;
an idle end attached to an opposed end of said center section from said drive end, said idle end including means for adjusting belt tension and tracking, and further including a roller;
a conveyor belt extending about said drive end, center section, and idle end so that said drive wheel may rotate said conveyor belt about said modular conveyor system; and
wherein said idle end further includes a stationary component that is attached to said center section, and a pivoting component that is attached to said stationary component so that said pivoting component may pivot in a transverse direction with respect to the longitudinal direction of said modular conveyor system.

17. The modular conveyor system set forth in claim 16, wherein said pivoting component may also slide in a longitudinal direction, thereby allowing the length of said idle end to be increased or decreased.

* * * * *